(12) United States Patent
Sugihara (10) Patent No.: US 10,303,721 B2
(45) Date of Patent: May 28, 2019

(54) MEETING MINUTES CREATION SYSTEM FOR CREATING MINUTES OF A MEETING

(71) Applicant: KYOCERA Document Solutions Inc., Osaka-shi, Osaka (JP)

(72) Inventor: Hiroshi Sugihara, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 3 days.

(21) Appl. No.: 15/849,762

(22) Filed: Dec. 21, 2017

(65) Prior Publication Data

US 2018/0181564 A1   Jun. 28, 2018

(30) Foreign Application Priority Data

Dec. 27, 2016  (JP) ................................ 2016-253341

(51) Int. Cl.

| | | |
|---|---|---|
| *G06F 17/30* | (2006.01) |
| *H04N 1/32* | (2006.01) |
| *H04N 1/23* | (2006.01) |
| *G06F 16/93* | (2019.01) |
| *H04L 29/06* | (2006.01) |
| *G06F 16/907* | (2019.01) |
| *G06F 16/9038* | (2019.01) |

(52) U.S. Cl.
CPC ............ *G06F 16/93* (2019.01); *G06F 16/907* (2019.01); *G06F 16/9038* (2019.01); *H04L 65/403* (2013.01); *H04N 1/2307* (2013.01); *H04N 1/32518* (2013.01)

(58) Field of Classification Search
CPC ............ G06F 17/30011; H04N 1/2307; H04N 1/32518; H04L 65/403
See application file for complete search history.

(56) References Cited

U.S. PATENT DOCUMENTS

| | | | |
|---|---|---|---|
| 2015/0261732 A1* | 9/2015 | Kim ..................... | G06F 17/2288 715/229 |
| 2017/0365258 A1* | 12/2017 | Cho ........................ | G10L 15/10 |
| 2018/0081929 A1* | 3/2018 | Tomita ................ | G06F 16/2379 |

FOREIGN PATENT DOCUMENTS

| | | |
|---|---|---|
| JP | H08-297624 A | 11/1996 |
| JP | H10-11427 | 1/1998 |
| JP | 2000-92048 A | 3/2000 |

* cited by examiner

*Primary Examiner* — Iriana Cruz
(74) *Attorney, Agent, or Firm* — Viering, Jentschura & Partner MBB (57) ABSTRACT

This meeting minutes creation system includes a server, and a plurality of terminal devices connected to the server via a network. The server includes an identifier assigning section, a determining section, a meeting minutes creating section, and an output controlling section. The identifier assigning section assigns an identifier to memo data pieces received by a server network interface unit to identify the memo data pieces. The determining section determines the content of the memo data pieces received at the same time among the memo data pieces with the identifier assigned by the identifier assigning section. The meeting minutes creating section creates meeting minutes with the memo data pieces combined in accordance with the determination results by the determining section. The output controlling section performs control operations to output the meeting minutes created by the meeting minutes creating section.

8 Claims, 6 Drawing Sheets

| elapsed time | contents of memo | identifier |
|---|---|---|
| 0:10 | Theme:X | A0010 |
| 0:10 | Theme:X | B0010 |
| 0:10 | Theme:X | C0010 |
| 0:15 | Action item:quality | A0015 |
| 0:15 | Action item:cost | B0015 |
| 0:15 | Action item:delivery date | D0015 |
| 0:20 | Set point:Y | B0020 |
| 0:25 | Keyword:Z | A0025 |
| 0:25 | Keyword:Z | B0025 |
| 0:25 | Keyword:Z | C0025 |
| 0:25 | Keyword:Z | D0025 |
| : | : | : |

FIG.6

MEETING MINUTES CREATION SYSTEM FOR CREATING MINUTES OF A MEETING

CROSS REFERENCE TO RELATED APPLICATIONS

This application claims priority to Japanese Patent Application No. 2016-253341, which was filed on Dec. 27, 2016, and is incorporated herein by reference in its entirety.

BACKGROUND

This disclosure relates to a meeting minutes creation system.

There are some conventionally-known technologies that have been used during meetings and gatherings to automatically create meeting materials and meeting minutes.

One of the conventionally-known technologies includes a method for semi-automatically managing meeting materials and making preparations necessary to hold a meeting in a teleconference system in which a plurality of computers are connected via a network, and the content displayed on the display of one of the computers is simultaneously displayed on all the other computers to share the same content. The typical method for semi-automatically managing and preparing meeting materials in a teleconference system includes: a step of storing meeting materials in a meeting server before the teleconference starts, and automatically creating attribute files of the meeting materials, such as the name of the materials and who created them; a step of performing management operations, including deletion and updates, on the meeting materials stored in the meeting server; a step of extracting information about the meeting materials stored in the meeting server from the attribute files and automatically creating a table of meeting contents based on the extracted information; a step of automatically distributing the materials stored in the meeting server and the table of meeting contents to the computer terminals of all the attendees before the teleconference; and a step of converting memos input through keyboards during the meeting into a minutes format to create teleconference minutes to be released publicly after the teleconference.

In addition, conventionally-known teleconference systems allow users to open a shared window on every networked computer to display identical data, and allow the users to exchange meeting data through the shared windows. One of the typical teleconference systems includes: a message generating means that when an input event of text data, image data, or audio data occurs, generates a message packet for data corresponding to every event that occurred, the message packet being assigned with identification information representing which types of text, image, or audio data the occurred event attributes to, and a sequence number representing the order in which the event occurs in the data types; a broadcasting means that broadcasts the message packet generated by the message generating means to all other networked computers; and a means that receives message packets transmitted from the other computers and the message packet transmitted from the computer that generated it using its own message generating means, displays the text data and image data in the order the events have occurred based on the identification information and sequence number contained in the message packet on a shared window, and reproduces the audio data in the order in which the events have occurred. This teleconference system is also characterized by updating input events of different types of data that occurred in a computer, for all the other computers, including the computer where the input event occurred, in real time.

A typical automatic minutes creating apparatus includes an audio input device, an audio-to-text conversion device that successively converts audio data input by the audio input device to text strings, and a file creating device that creates a first file containing a document with the text strings converted by the audio-to-text conversion device arranged in order. If the audio-to-text conversion device provides a plurality of candidate text strings during the conversion of an audio part, the typical automatic minutes creating apparatus creates a second file that contains data about location information of a document part corresponding to the audio part in the first file.

SUMMARY

A meeting minutes creation system according to the present disclosure includes a server, and a plurality of terminal devices connected to the server via a network, and creates minutes of a meeting. Each of the terminal devices includes a transmission control section. The transmission control section performs control operations to transmit memo data pieces about the meeting to the server. The server includes a receiving unit, an identifier assigning section, a determining section, a meeting minutes creating section, and an output controlling section. The receiving unit receives a plurality of memo data pieces transmitted from a transmission control section provided to each of the terminal devices. The identifier assigning section assigns an identifier to each of the memo data pieces received by the receiving unit to identify the memo data pieces. The determining section determines the content of the memo data pieces received at the same time among the memo data pieces with the identifier assigned by the identifier assigning section. The meeting minutes creating section creates meeting minutes with the memo data pieces combined in accordance with the determination results by the determining section. The output controlling section performs control operations to output the meeting minutes created by the meeting minutes creating section.

DETAILED DESCRIPTION

Figure 1:
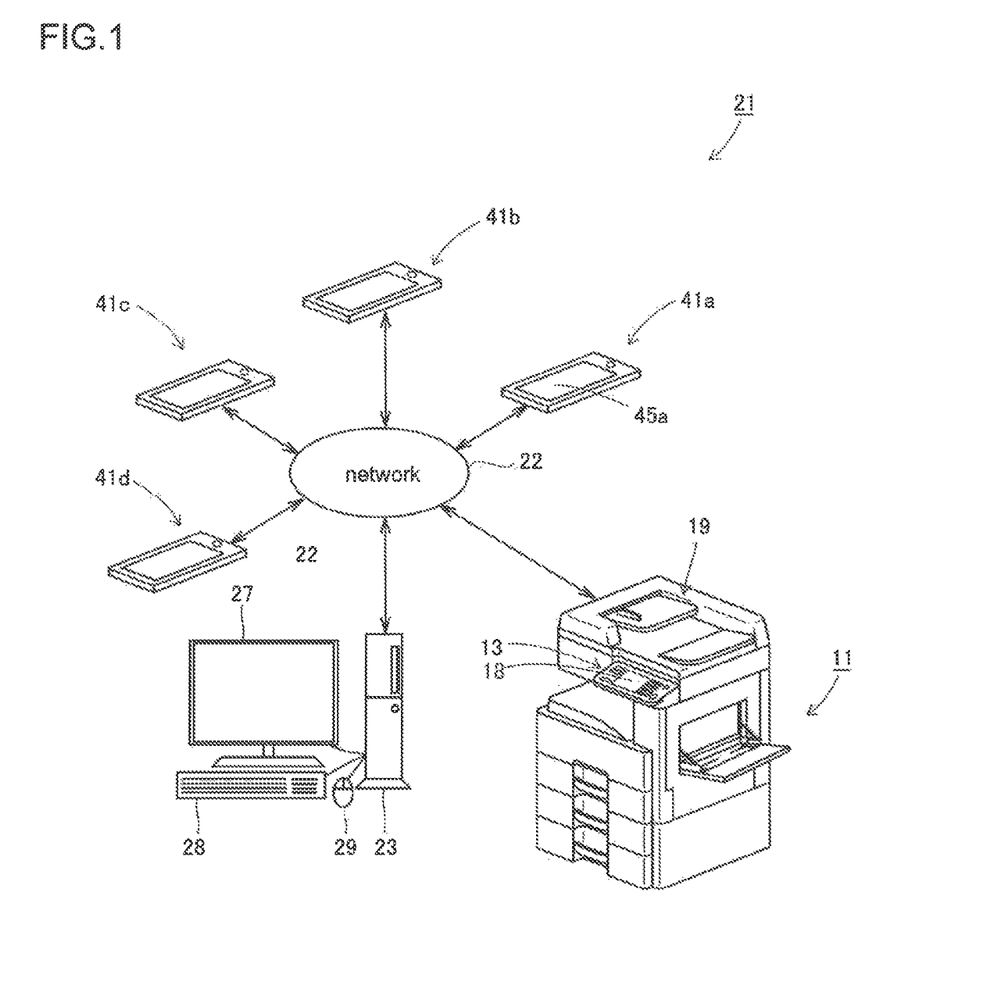
FIG. 1 is an external view showing the configuration of the entire meeting minutes creation system according to an embodiment of the disclosure.
Figure 2:
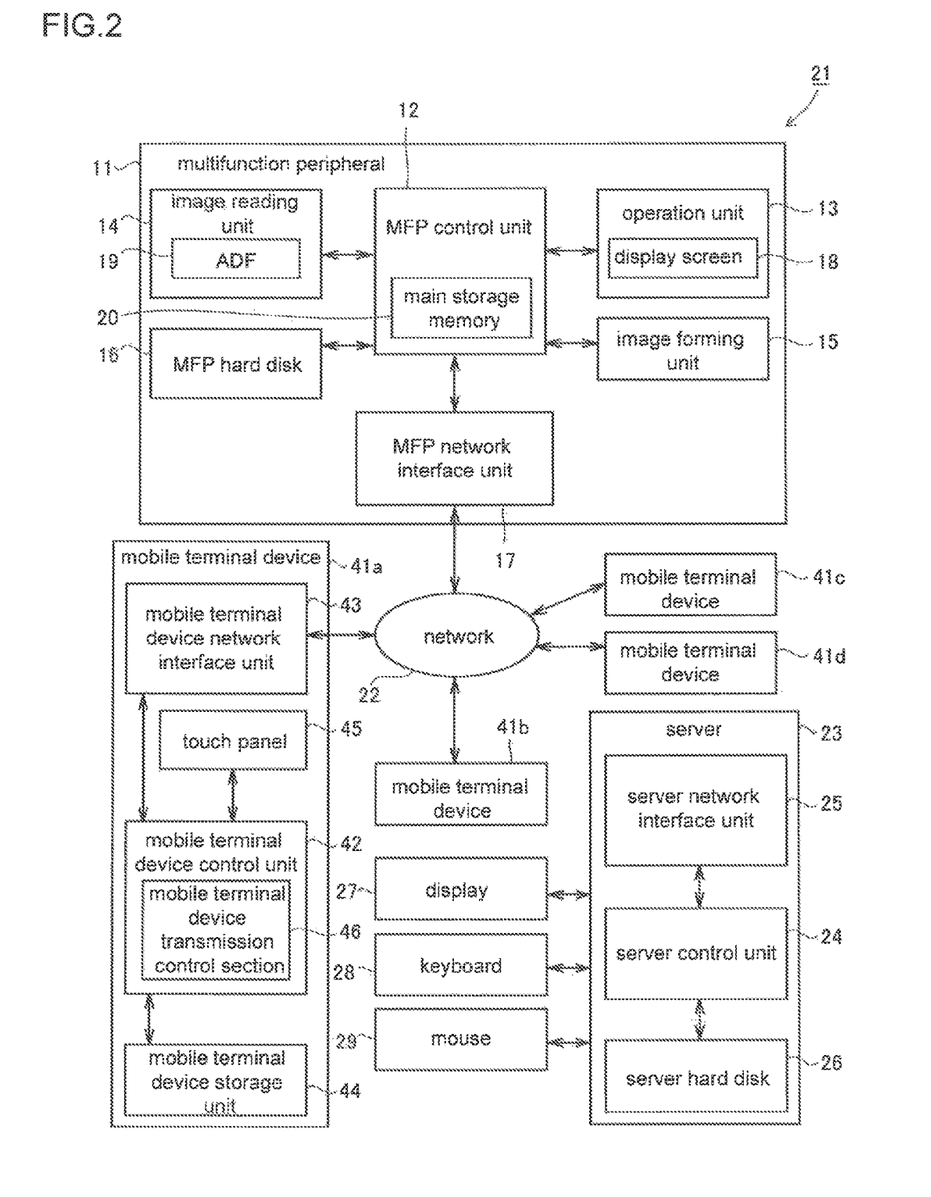
FIG. 2 is a block diagram showing the configuration of the meeting minutes creation system shown in FIG. 1.

Reference is made below to an embodiment of the present disclosure. FIG. 1 is an external view showing the configuration of the entire meeting minutes creation system according to the embodiment of the disclosure. FIG. 2 is a block diagram showing the configuration of the meeting minutes creation system shown in FIG. 1.

Referring to FIGS. 1 and 2, the meeting minutes creation system 21 includes a server 23, a multifunction peripheral 11 as an image forming apparatus, and a plurality of terminal devices, in this embodiment, four mobile terminal devices 41a, 41b, 41c, 41d. The multifunction peripheral 11 is connected to the server 23 via a network 22. Each of the four mobile terminal devices 41a, 41b, 41c, 41d is also connected to the server 23 via the network 22. In this example, they are all connected wirelessly. The mobile terminal devices 41a to 41d are owned by user A, user B, user C, and user D, respectively, who are attendees of a meeting and create minutes of the meeting. Users A to D make a memo in the meeting using their own mobile terminal devices 41a to 41d.

Next, the configuration of the multifunction peripheral 11 will be described. The multifunction peripheral 11 includes a multifunction peripheral (MFP) control unit 12, an operation unit 13, an image reading unit 14, an image forming unit 15, a multifunction peripheral (MFP) hard disk 16 as a storage unit, and a multifunction peripheral (MFP) network interface unit 17 used to connect with the network 22.

The MFP control unit 12 controls the entire multifunction peripheral 11. The MFP control unit 12 is composed of a CPU and some other components, and includes a main storage memory 20 that temporarily stores data. Incidentally, a server control unit 24 and a mobile terminal device control unit 42, which will be described later, are configured in the same manner as the MFP control unit 12. The operation unit 13 includes a display screen 18 that serves as a display unit displaying information submitted from the multifunction peripheral 11 and entries made by users. The operation unit 13 allows users to input image forming conditions, such as the number of copies and the gradation degrees, and to turn on or off the power source. The image reading unit 14 includes an auto document feeder (ADF) 19 serving as a document transporting device that transports an original document placed on a loading position to a reading position. The image reading unit 14 reads images of an original document loaded in the ADF 19 or placed on a document table (not shown). The image forming unit 15 forms images on paper based on images read by the image reading unit 14, image data transmitted via the network 22, or image data stored in the MFP hard disk 16.

Next, the configuration of the mobile terminal device 41a will be described. The configurations of the mobile terminal devices 41b, 41c, 41d are the same as that of the mobile terminal device 41a, and therefore their explanations will be omitted.

The mobile terminal device 41a includes a mobile terminal device control unit 42, a mobile terminal device network interface unit 43 used to connect with the network 22, a mobile terminal device storage unit 44, and a touch panel 45. The mobile terminal device control unit 42 controls the entire mobile terminal device 41a. The mobile terminal device storage unit 44 stores image data and other various types of data. The touch panel 45 displays information of the mobile terminal device 41a and also serves as an input interface. User A having the mobile terminal device 41a inputs various types of data, for example, memo data about a meeting through the touch panel 45. The data input by user A through the touch panel 45 is temporarily stored in the mobile terminal device control unit 42.

The mobile terminal device control unit 42 includes a mobile terminal device transmission control section 46 that performs control operations to transmit the memo data about the meeting to the server 23. The mobile terminal device transmission control section 46 controls the mobile terminal device network interface unit 43 to transmit the memo data, which was input by user A, to the server 23 via the network 22.

Next, the configuration of the server 23 will be described. A display 27, a keyboard 28, and a mouse 29 are connected to the server 23. The display 27 displays information and data from the server 23. The user inputs data to the server 23 using the keyboard 28 and mouse 29 while checking the screen displayed on the display 27.

The server 23 includes a server control unit 24 that controls the server 23 itself, a server network interface unit 25 that is used to connect with the network 22, and a server hard disk 26 that stores data. The server network interface unit 25 operates as a receiving unit that receives a plurality of memo data pieces transmitted from the four mobile terminal devices 41a, 41b, 41c, 41d. The server hard disk 26 stores various types of data, such as image data of files.

Figure 3:
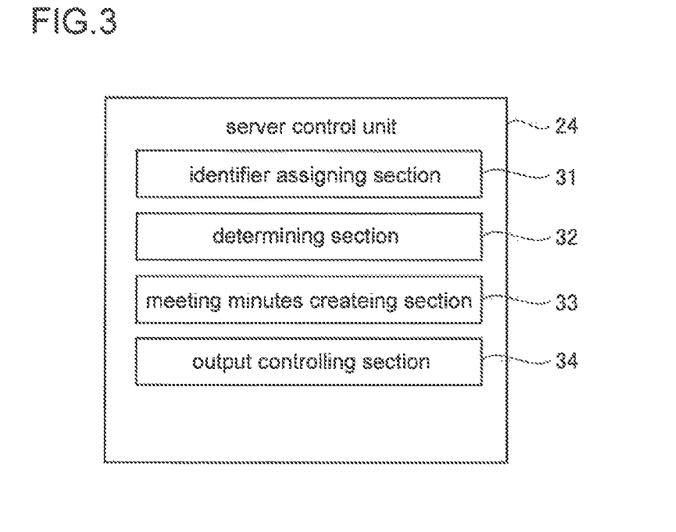
FIG. 3 is a block diagram showing the configuration of a server control unit.

Next, the configuration of the server control unit 24 will be described. FIG. 3 is a block diagram showing the configuration of the server control unit 24. Referring to FIG. 3, the server control unit 24 includes an identifier assigning section 31, a determining section 32, a meeting minutes creating section 33, and an output controlling section 34. The identifier assigning section 31 assigns an identifier to each of memo data pieces received by the server network interface unit 25 to uniquely identify the memo data pieces. The identifier assigned by the identifier assigning section 31 includes the user name of the memo data sender and the time when the memo data was transmitted. Among a plurality of memo data pieces received by the server network interface unit 25, the determining section 32 determines the contents of memo data pieces received at the same time. The meeting minutes creating section 33 creates meeting minutes containing the memo data pieces combined in accordance with the determination results provided by the determining section 32. The output controlling section 34 performs control operations to output the meeting minutes created by the meeting minutes creating section 33. The configurations of these sections will be described later in detail.

Figure 4:
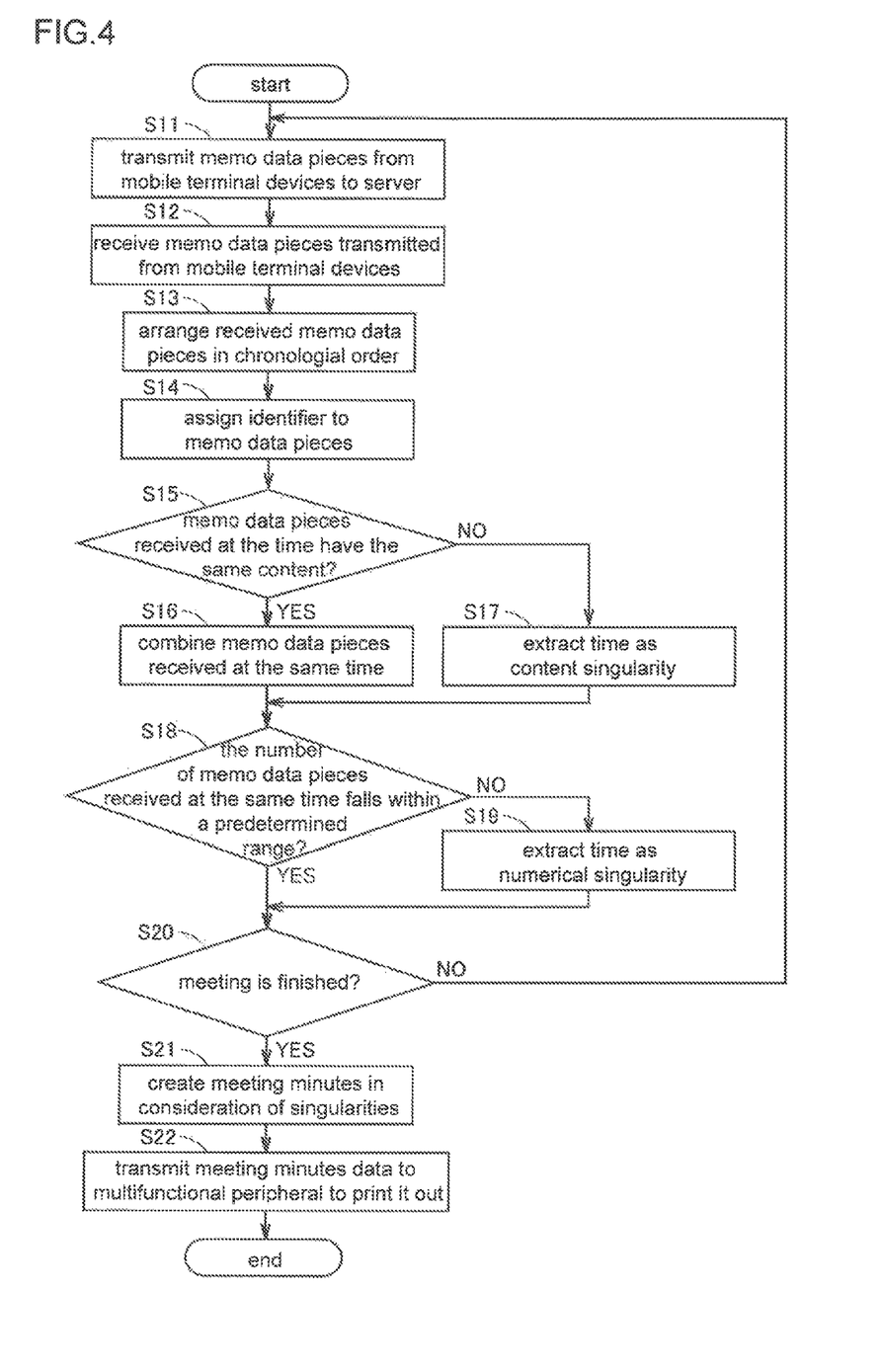
FIG. 4 is a flowchart describing an operational procedure to create meeting minutes using the meeting minutes creation system.

Next, a description will be made on how the meeting minutes creation system 21 according to the embodiment of the disclosure creates meeting minutes. FIG. 4 is a flowchart describing an operational procedure to create meeting minutes with the meeting minutes creation system 21. In this example, the mobile terminal device 41a is owned by user A, the mobile terminal device 41b is owned by user B, the mobile terminal device 41c is owned by user C, and the mobile terminal device 41d is owned by user D.

Referring to FIG. 4, once a meeting starts, firstly, time measurement starts, and also users A to D having the mobile terminal devices 41a to 41d, respectively, start making a memo in a timely manner using the mobile terminal devices 41a to 41d. Specifically, users A to D use the touch panel 45 of their own mobile terminal devices 41a to 41d to input memos about the contents of the meeting that are regarded as being important or necessary for users A to D. The mobile terminal devices 41a to 41d process the input memos into data pieces, and transmit the data pieces as memo data pieces via the network 22 to the server 23 using the mobile terminal device transmission control section 46 (step S11 in FIG. 4, hereinafter, "step" is omitted). In this example, the memo data pieces are transmitted immediately after memos are input, or, in other words, in real time.

The server network interface unit 25 receives the memo data pieces transmitted from the mobile terminal devices 41a to 41d (S12). Then, the received memo data pieces are arranged in chronological order (S13). Upon receiving the memo data pieces from the mobile terminal devices 41a to 41d, the identifier assigning section 31 assigns an identifier to each of the memo data pieces (S14). As described above, the identifier is, for example, a combination of the name of a user who owns any of the mobile terminal devices 41a to 41d that transmitted the memo data pieces, and the time at which the memo data pieces were transmitted. Specifically speaking, if user A transmits a memo data piece 10 minutes after the meeting started, the identifier assigning section 31 assigns an identifier "A0010" to the memo data piece received. The memo data piece assigned with the identifier is temporarily stored in the server control unit 24.

In this manner, identifiers are assigned to memo data pieces transmitted from the mobile terminal devices 41a to 41d as the meeting proceeds. The memo data pieces with the identifiers are stored and accumulated in the server control unit 24.

Figure 5:
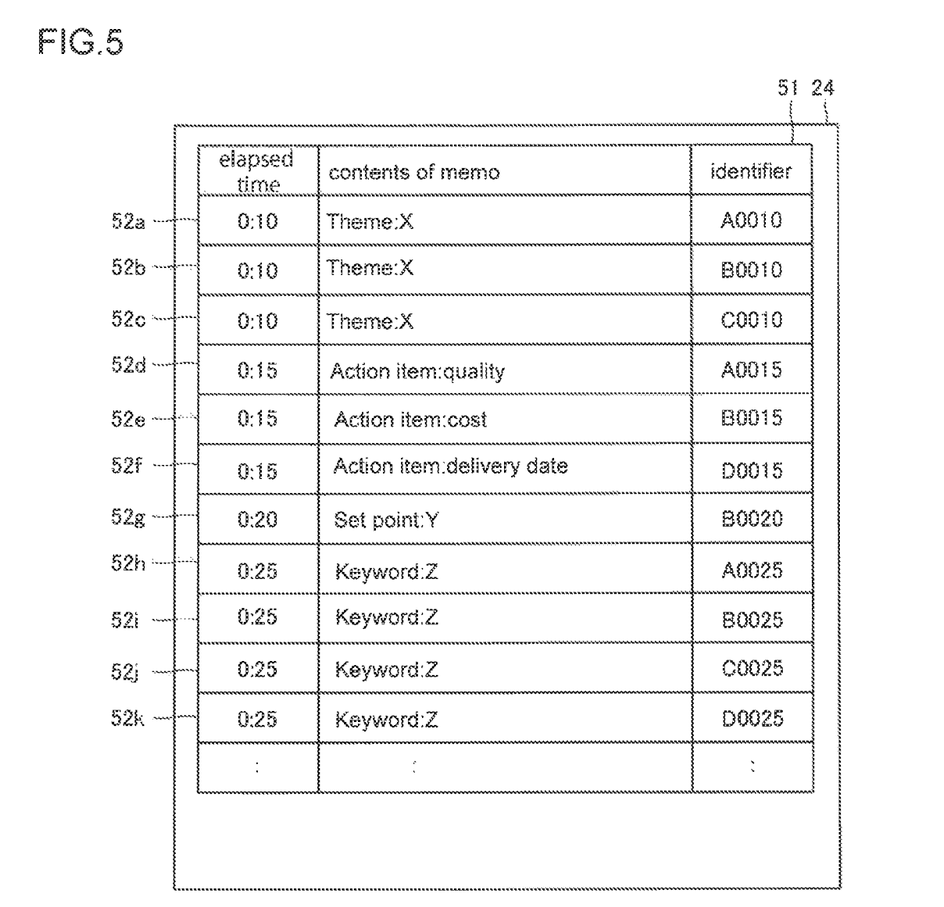
FIG. 5 illustrates an example of a plurality of memo data pieces.

FIG. 5 is a conceptual diagram showing, by way of example, the memo data pieces stored in the server control unit 24. Referring to FIG. 5, a memo data set 51 including a plurality of memo data pieces is stored in the server control unit 24. The memo data set 51 includes memo data pieces 52a, 52b, 52c, 52d, 52e, 52f, 52g, 52h, 52i, 52j, 52k. The memo data pieces 52a to 52k have their own identifiers. In order to provide a clear understanding, FIG. 5 shows the memo data pieces 52a to 52k making up the memo data set 51 in a table format.

Description will be made about the memo data pieces 52a to 52k. The memo data piece 52a is a memo data piece containing "Theme: X", that was transmitted from the mobile terminal device 41a owned by user A, received 10 minutes after the start of the meeting, and assigned with an identifier "A0010". In other words, the content of the memo data piece is "Theme: X". The memo data piece 52b is a memo data piece containing "Theme: X", that was transmitted from the mobile terminal device 41b, received 10 minutes after the start of the meeting, that is, at the same time when the memo data piece 52a was received, and assigned with an identifier "B0010". The memo data piece 52c is a memo data piece containing "Theme: X", that was transmitted from the mobile terminal device 41c, received at the same time when the memo data pieces 52a and 52b were received, and assigned with an identifier "C0010". The contents of the memo data pieces 52b and 52c are also "Theme: X".

The memo data piece 52d is a memo data piece containing "Action item: quality", that was transmitted from the mobile terminal device 41a owned by user A, received 15 minutes after the start of the meeting, and assigned with an identifier "A0015". The memo data piece 52e is a memo data piece containing "Action item: cost", that was transmitted from the mobile terminal device 41b owned by user B, received 15 minutes after the start of the meeting, and assigned with an identifier "B0015". The memo data piece 52f is a memo data piece containing "Action item: delivery date", that was transmitted from the mobile terminal device 41d owned by user D, received 15 minutes after the start of the meeting, and assigned with an identifier "D0015". The memo data pieces 52d to 52f were received at the same time, but have different contents. This means that users A, B, D input different words at the same time during the meeting.

The memo data piece 52g is a memo data piece containing "Set point: Y", that was transmitted from the mobile terminal device 41b owned by user B, received 20 minutes after the start of the meeting, and assigned with an identifier "B0020". At the time, no memo data pieces were transmitted from the mobile terminal devices 41a, 41c, 41d owned by users A, C, D, and no memo data pieces were received by the server 23. This means that only user B transmitted a memo data piece 20 minutes after the start of the meeting.

The memo data piece 52h is a memo data piece containing "Keyword: Z", that was transmitted from the mobile terminal device 41a owned by user A, received 25 minutes after the start of the meeting, and assigned with an identifier "A0025". The memo data piece 52i is a memo data piece containing "Keyword: Z", that was transmitted from the mobile terminal device 41b owned by user B, received 25 minutes after the start of the meeting, and assigned with an identifier "B0025". The memo data piece 52j is a memo data piece containing "Keyword: Z", that was transmitted from the mobile terminal device 41c owned by user C, received 25 minutes after the start of the meeting, and assigned with an identifier "C0025". The memo data piece 52k is a memo data piece containing "Keyword: Z", that was transmitted from the mobile terminal device 41d owned by user D, received 25 minutes after the start of the meeting, and assigned with an identifier "D0025". This means that, in 25 minutes after the start of the meeting, all the attendees of the meeting transmitted memo data pieces through the mobile terminal devices 41a to 41d, and the server 23 received the memo data pieces.

Next, the determining section 32 determines the contents of the memo data pieces received at the same time among the plurality of memo data pieces 52a to 52k assigned with the identifiers by the identifier assigning section 31. In this process, the determining section 32 determines whether the memo data pieces received at the same time have the same content (S15). The determining section 32 also determines whether the number of the memo data pieces received at the same time falls within a predetermined range (S18). The predetermined range in this example is two to three memo data pieces.

Among the memo data pieces 52a to 52k, specifically, the memo data pieces 52a to 52c, the memo data pieces 52d to 52f, and the memo data pieces 52h to 52k are received at the same times, respectively, in this example. The memo data pieces 52a to 52c have the same content "Theme: X". So, the memo data pieces 52a to 52c are determined to have the same content (YES in S15). Then, the meeting minutes creating section 33 combines the contents of the memo data pieces 52a to 52c (S16). The combined contents are expressed by a single phrase without repeating the same phrase.

The memo data pieces 52d to 52f were received at the same time, but have different contents: "Action item: quality"; "Action item: cost"; and "Action item: delivery date". So, the memo data pieces 52d to 52f are determined not to have the same content, in other words, they are determined to have different contents (NO in S15). Then, the meeting minutes creating section 33 does not combine the contents of the memo data pieces 52d to 52f, but extracts the individual contents as content singularities (S17).

The memo data piece 52g contains "Set point: Y", and is the only one memo data piece received at the time. In this case, the determining section 32 determines that the number of the memo data pieces received at the same time is out of the predetermined range (NO in S18). Thus, the meeting minutes creating section 33 extracts the time at which the memo data piece 52g was received, as a numerical singularity (S19).

The memo data pieces 52h, 52i, 52j, 52k, which were received at the same time, have the same content, which is "Keyword: Z". The meeting minutes creating section 33 combines the contents of the memo data pieces 52h to 52k. Specifically, the contents are expressed by a single phrase without repeating the same phrase. The memo data pieces 52h to 52k are four memo data pieces received at the same time. In this case, the determining section 32 determines that the number of the memo data pieces received at the same time is out of the predetermined range (NO in S18). Thus, the meeting minutes creating section 33 extracts the time at which the memo data pieces 52h to 52k were received, as a numerical singularity (S19).

At the time when the memo data pieces 52a to 52c were received and the time when the memo data pieces 52d to 52f were received, the determining section 32 determines that the number of the memo data pieces received at the same time falls within the predetermined range (YES in S18). The determination is continuously performed until the meeting finishes or until no more memo data pieces are received (S20).

The meeting minutes creating section 33 combines the memo data pieces 52a to 52k in accordance with the determination results by the determining section 32 to create meeting minutes. In this case, meeting minutes data is generated in the server control unit 24 (S21).

Figure 6:
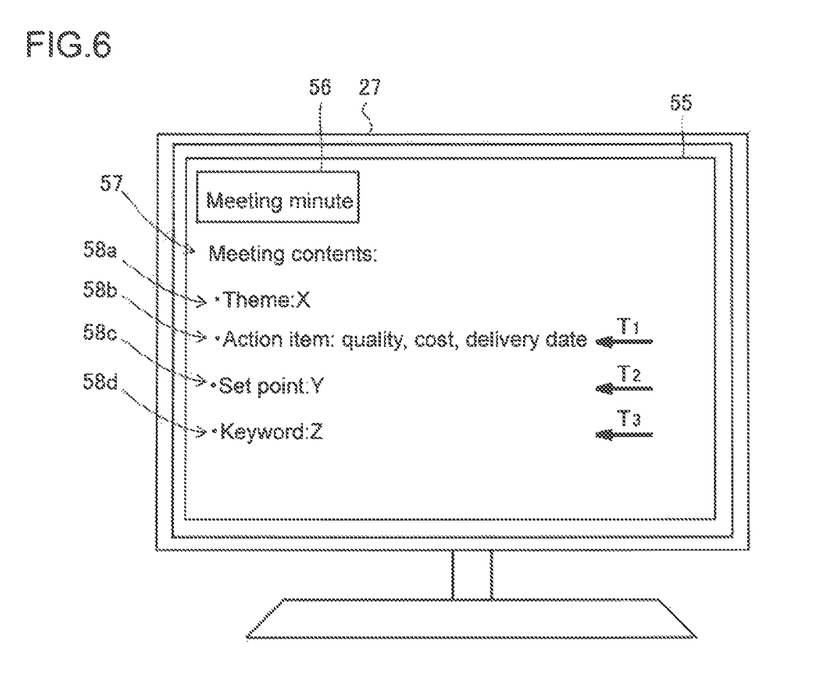
FIG. 6 shows an example of created meeting minutes data.

FIG. 6 shows an example of created meeting minutes data. Referring to FIG. 6, meeting minutes data 55 is displayed on the display 27. The meeting minutes data 55 includes a title 56 "Meeting minutes", a subtitle 57 "Meeting contents:", a content 58a "Theme: X", a content 58b "Action item: quality, cost, delivery date", a content 58c "Set point: Y", a content 58d "Keyword: Z", an arrow T1 indicating the content singularities associated with the content 58b, an arrow T2 indicating the numerical singularity associated with the content 58c, and an arrow T3 indicating the numerical singularity associated with the content 58d. The contents 58a to 58d are agenda topics. Since the content 58a has neither a content singularity nor numerical singularity, it is displayed as it is without any processing. The content 58b, which has the content singularity, is followed by an arrow T1 to indicate the content singularity, and the contents 58c and 58d, which have the numerical singularities, are followed by an arrow T2 and arrow T3, respectively, to indicate the numerical singularities.

The meeting minutes creating section 33 combines and performs some other processing on the memo data pieces 52a to 52k to create meeting minutes. The created meeting minutes are displayed on the display 27 that is connected to the server 23.

User E who is responsible for editing the meeting minutes views the meeting minutes data 55 displayed on the display 27, and edits it if necessary. This means that the meeting minutes creating section 33 accepts the edits of the created meeting minutes. When editing the content indicated as content singularities, more specifically, the content 58b that is derived from the memo data pieces 52d to 52f, one of the words, "quality", "cost", and "delivery date" is selected to edit the content. When editing the content 58c indicated as a numerical singularity due to a paucity of memo data pieces, the content 58c may be deleted. When editing the content 58d indicated as numerical singularities due to an excess of memo data pieces, the content 58d may be underlined or color-coded.

The data of the meeting minutes that was edited and completed is transmitted to the multifunction peripheral 11. The multifunction peripheral 11 receives the created meeting minutes data 55, then forms an image based on the received data, and prints it out (S22). Specifically, the output controlling section 34 transmits image data of the meeting minutes created by the meeting minutes creating section 33 to the multifunction peripheral 11, and controls the multifunction peripheral 11 to output the image data on paper.

According to the above-described configuration, among the plurality of memo data pieces transmitted from the attendees of the meeting through their mobile terminal devices 41a to 41d, the memo data pieces received at the same time are checked for their contents, and the memo data pieces are combined in accordance with the determination results to create meeting minutes. For example, if a plurality of memo data pieces are combined at a certain time, the attendees can recognize at that time that a plurality of attendees have transmitted the same memo data pieces, and can easily recognize how much the attendees understand what is happening. Specifically, if there are no different opinions, a combined memo is transmitted to the attendees at that time in the meeting. Based on the combined memo, the attendees can recognize that the attendees understand the content of the meeting in the same way. In addition, the meeting minutes can be created with the same content parts regarded as a notable point. Therefore, this meeting minutes creation system 21 can easily provide the attendees' comprehension level of the meeting, and can easily create meeting minutes that make it easy for the attendees to find notable points.

In addition, the determining section 32 is configured to determine whether a plurality of memo data pieces received at the same time have the same content. If the determining section 32 determines that the memo data pieces received at the same time have the same content, the meeting minutes creating section 33 is configured to combine the contents of the memo data pieces that were determined to be the same into one to create meeting minutes. Accordingly, the meeting minutes can be more efficiently created.

On the contrary, if the determining section 32 determines that the memo data pieces received at the same time do not have the same content, the meeting minutes creating section 33 is configured to extract the time as a content singularity to create meeting minutes. This can make the attendees of the meeting recognize that the attendees have made memos of different opinions at the time that was extracted as a content singularity. This can also make the attendees recognize the possibility of misunderstandings among them. The creator of the meeting minutes can give feedback on the content discussed at the time during the meeting to edit the meeting minutes. Alternatively, the creator can recognize the agenda discussed at the time as a difficult point to achieve agreement for the next meeting.

In addition, the determining section 32 is configured to determine whether the number of the memo data pieces received at the same time falls within a predetermined range. If the determining section 32 determines that the number of the memo data pieces received at the same time is out of the predetermined range, the meeting minutes creating section 33 is configured to extract the time as a numerical singularity to create meeting minutes. This configuration can facilitate the creator of the meeting minutes in editing minutes as intended for the time at which a lot of memo data pieces are received or few memo data pieces are received. Specifically, in the case of a singularity extracted due to a paucity of memo data pieces, if the memo data piece is considered as an important point by the facilitator or organizer of the meeting, the facilitator or organizer can recognize that the attendees do not understand the importance. In the case of a singularity extracted due to an excess of memo data pieces, if the memo data pieces are considered as an unimportant point by the facilitator or organizer of the meeting, the facilitator or organizer can recognize that the memo content is not important to the attendees, but have drawn the interest.

In addition, the output controlling section 34 is configured to transmit image data of the meeting minutes created by the meeting minutes creating section 33 to the multifunction peripheral 11 and control the multifunction peripheral 11 to output the image data on paper, thereby facilitating output of the created meeting minutes onto paper.

Furthermore, the identifier assigning section 31 is configured to assign an identifier including the user name of the memo data sender and the time at which the memo data piece was transmitted, thereby generating and assigning a well-defined identifier.

In a case where a presentation material is used in a meeting in the above-described embodiment, the meeting minutes creation system can create meeting minutes by associating a memo with the content and the time of the presentation material. Specifically, the meeting minutes creating section 33 associates the material to be explained at a certain time in the course of the meeting with a determination result provided by the determining section 32 to create meeting minutes. This can make clear the relevance between the presentation material and the memo, thereby creating meeting minutes that make it easy for the attendees to find notable points.

Although the output controlling section 34 in the above-described embodiment is configured to transmit meeting minutes data to the multifunction peripheral 11 and control the multifunction peripheral 11 to form and print an image of the meeting minutes, the present disclosure is not limited thereto, and the output controlling section 34 can be configured to transmit and output the created meeting minutes data to the mobile terminal devices 41a to 41d owned by the respective user A, user B, user C, and user D. This can save paper resources.

Although users A to D own the mobile terminal devices 41a to 41d, respectively, in the above-described embodiment, the present invention is not limited thereto, and users A to D can have tablet PCs or desktop computers, and use them to input and transmit memo data to the server 23.

Although, the meeting minutes creating section 33 is configured to accept edits made on created meeting minutes in the above-described embodiment, the present disclosure is not limited thereto, and another device or apparatus can be used to edit the created meeting minutes.

Although the content singularities and numerical singularities are indicated with the arrows T1, T2 and T3 in the meeting minutes data in the above-described embodiment, the present disclosure is not limited thereto, and the content singularities and numerical singularities can be indicated by color-coding, hatching, highlighting, and so on. In addition, the content singularities and numerical singularities can be indicated with the corresponding details (i.e., differences among the contents of the memo data pieces, an excess of memo data pieces, a paucity of memo data pieces, the number of memo data pieces, etc.).

Although, the server 23 is connected to the mobile terminal devices 41a to 41d and some other devices or apparatuses via the network 22 in the above-described embodiment, the present disclosure is not limited thereto, and the devices can directly communicate with the server or can be connected to the server on cloud computing.

The above-described meeting minutes creation system 21 is applicable to educational settings, such as schools. In this case, students make memos during class and transmit the memos as memo data pieces to the server 23 in the same way as described above. The memo data pieces are stored in chronological order. The memo data pieces received at the same time and having the same content are combined, while the memo data pieces having different contents are extracted as content singularities to be distinguished from one another. Students who transmitted few memos are extracted as numerical singularities. Therefore, the teachers can grasp the students' comprehension level and some other conditions in class by checking the combined items and items extracted as singularities. This process can be further extended to feedback.

It should be understood that the embodiment disclosed herein is illustrative and non-restrictive in every respect. The scope of the present disclosure is defined by the terms of the claims, rather than by the foregoing description, and is intended to include any modifications within the scope and meaning equivalent to the terms of the claims.

The meeting minutes creation system according to the present disclosure is effectively used especially to meet a demand for easy creation of meeting minutes.

What is claimed is:

1. A meeting minutes creation system for creating minutes of a meeting comprising: a server, multifunction peripheral, and a plurality of terminal devices connected to the server via a network, wherein each of the terminal devices includes a transmission control section that performs control operations to transmit a memo data piece about the meeting to the server, and the server includes:
　　a receiving unit that receives a plurality of memo data pieces transmitted from the transmission control section provided in each of the terminal devices,
　　an identifier assigning section that assigns an identifier to each of the memo data pieces received by the receiving unit, the identifier being assigned to identify each of the memo data pieces,
　　a determining section that determines content of the memo data pieces received at the same time among the memo data pieces with the identifiers assigned by the identifier assigning section, the determining section determines whether the memo data pieces received at the same time have the same content,
　　if the determining section determines that the memo data pieces received at the same time have the same content, the meeting minutes creating section combines the contents of the memo data pieces determined to be the same into one to create meeting minutes, and
　　if the determining section determines that the memo data pieces received at the same time do not have the same content, the meeting minutes creating section extracts the time as a content singularity to create meeting minutes,
　　a meeting minutes creating section that creates meeting minutes with the memo data pieces combined in accordance with the determination results by the determining section,
　　an output controlling section that performs control operations to output the meeting minutes to the multifunction peripheral created by the meeting minutes creating section,
　　the multifunction peripheral apparatus configured to receive the meeting minutes from the output controlling section and configured to form an image on paper based on the meeting minutes.

2. The meeting minutes creation system according to claim 1, wherein
the determining section determines whether the number of the memo data pieces received at the same time falls within a predetermined range, and
if the determining section determines that the number of the memo data pieces received at the same time is out of the predetermined range, the meeting minutes creating section extracts the time as a numerical singularity to create meeting minutes.

3. The meeting minutes creation system according to claim 1, wherein
the meeting minutes creating section associates a material to be explained at a certain time in the course of the meeting with a determination result provided by the determining section to create meeting minutes.

4. The meeting minutes creation system according to claim 1, wherein
the identifier assigned by the identifier assigning section includes a user name of a memo data sender and the time at which the memo data piece has been transmitted.

5. The meeting minutes creation system according to claim 4, wherein
the meeting minutes creating section creates the meeting minutes so as to make the user name, which is assigned by the identifier assigning section, recognizable.

6. The meeting minutes creation system according to claim 1, wherein
the meeting minutes creating section accepts edits of the created meeting minutes.

7. The meeting minutes creation system according to claim 1, wherein
the meeting minutes creating section indicates the content singularities by color-coding, hatching, or highlighting to create the meeting minutes.

8. The meeting minutes creation system according to claim 2, wherein
the meeting minutes creating section indicates the numerical singularities by color-coding, hatching, or highlighting to create the meeting minutes.

* * * * *